United States Patent
Bowman et al.

(10) Patent No.: US 9,342,699 B2
(45) Date of Patent: May 17, 2016

(54) METHOD AND APPARATUS FOR CONTROLLING ACCESS TO ENCRYPTED DATA

(71) Applicants: BLACKBERRY LIMITED, Waterloo (CA); QNX SOFTWARE SYSTEMS LIMITED, Kanata (CA)

(72) Inventors: Roger Paul Bowman, Kitchener (CA); Sivakumar Nagarajan, Ottawa (CA); Christopher Lyle Bender, Kitchener (CA); Timothy Lee Segato, Kitchener (CA)

(73) Assignees: BLACKBERRY LIMITED, Waterloo, Ontario (CA); 2236008 ONTARIO INC., Waterloo, Ontario (CA)

( * ) Notice: Subject to any disclaimer, the term of this patent is extended or adjusted under 35 U.S.C. 154(b) by 227 days.

(21) Appl. No.: 14/072,939

(22) Filed: Nov. 6, 2013

(65) Prior Publication Data
US 2015/0127952 A1 May 7, 2015

(51) Int. Cl.
*G06F 12/14* (2006.01)
*G06F 21/60* (2013.01)
*G11B 20/00* (2006.01)

(52) U.S. Cl.
CPC .......... *G06F 21/602* (2013.01); *G11B 20/0021* (2013.01)

(58) Field of Classification Search
CPC .......................... G06F 21/602; G11B 20/0021
USPC ........................................................ 713/189
See application file for complete search history.

(56) References Cited

U.S. PATENT DOCUMENTS

| | | | |
|---|---|---|---|
| 6,367,019 B1 | 4/2002 | Ansell et al. | |
| 8,510,552 B2* | 8/2013 | De Atley | H04L 9/0891 380/277 |
| 2004/0049687 A1 | 3/2004 | Orsini et al. | |
| 2005/0232415 A1 | 10/2005 | Little et al. | |
| 2006/0190724 A1 | 8/2006 | Adams et al. | |
| 2010/0150342 A1* | 6/2010 | Richards | H04L 9/0833 380/30 |
| 2011/0035600 A1* | 2/2011 | Busser | G06F 21/62 713/189 |
| 2011/0238985 A1 | 9/2011 | Sovio et al. | |
| 2011/0252234 A1* | 10/2011 | De Atley | H04L 9/0891 713/165 |

OTHER PUBLICATIONS

Search Report dated Apr. 22, 2015, issued on Corresponding European Patent Application No. 14191915.9. 7 pages.
SMS & Apps Lock https://play.google.com/store/apps/details?id=mig.app.sms; accessed Oct. 3, 2013.

* cited by examiner

*Primary Examiner* — Mohammad W Reza
(74) *Attorney, Agent, or Firm* — Perry + Currier, Inc

(57) ABSTRACT

A method and apparatus for controlling access to encrypted data is provided. The device comprises: a processor and a memory, the processor configured to: control access to encrypted data, stored at the memory, the encrypted data categorized according to a plurality of categories, using a respective encryption key for each category in the plurality of categories; and, control access to a given encryption key according to given criteria associated with a given category, respective criteria different for each respective category, access to the given encryption key including one or more of, when the respective criteria are met: generating the given encryption key and decrypting the given encryption key.

13 Claims, 9 Drawing Sheets

300 

```
┌─────────────────────────────────────┐
│ Controlling Access To Encrypted Data, The │
│ Encrypted Data Categorized According To A │
│ Plurality Of Categories, Using A Respective │
│ Encryption Key For Each Category In The │
│      Plurality Of Categories        │
│                 301                 │
└─────────────────────────────────────┘
                   │
                   ▼
┌─────────────────────────────────────┐
│ Controlling Access To A Given Encryption Key │
│ According To Given Criteria Associated With A │
│ Given Category, Respective Criteria Different For │
│ Each Respective Category, Access To The │
│ Given Encryption Key Including One Or More Of, │
│      When The Respective Criteria Are Met: │
│ Generating The Given Encryption Key And │
│   Decrypting The Given Encryption Key │
│                 303                 │
└─────────────────────────────────────┘
                   │
                   ▼
┌─────────────────────────────────────┐
│ Destroying The Given Encryption Key Once │
│ Access To The Given Category Of Encrypted │
│          Data Occurs                │
│                 305                 │
└─────────────────────────────────────┘
```

Fig. 3

METHOD AND APPARATUS FOR CONTROLLING ACCESS TO ENCRYPTED DATA

FIELD

The specification relates generally to devices, and specifically to a method and apparatus for controlling access to encrypted data.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts a method for controlling access to encrypted data, according to non-limiting implementations.

DETAILED DESCRIPTION

Figure 1:
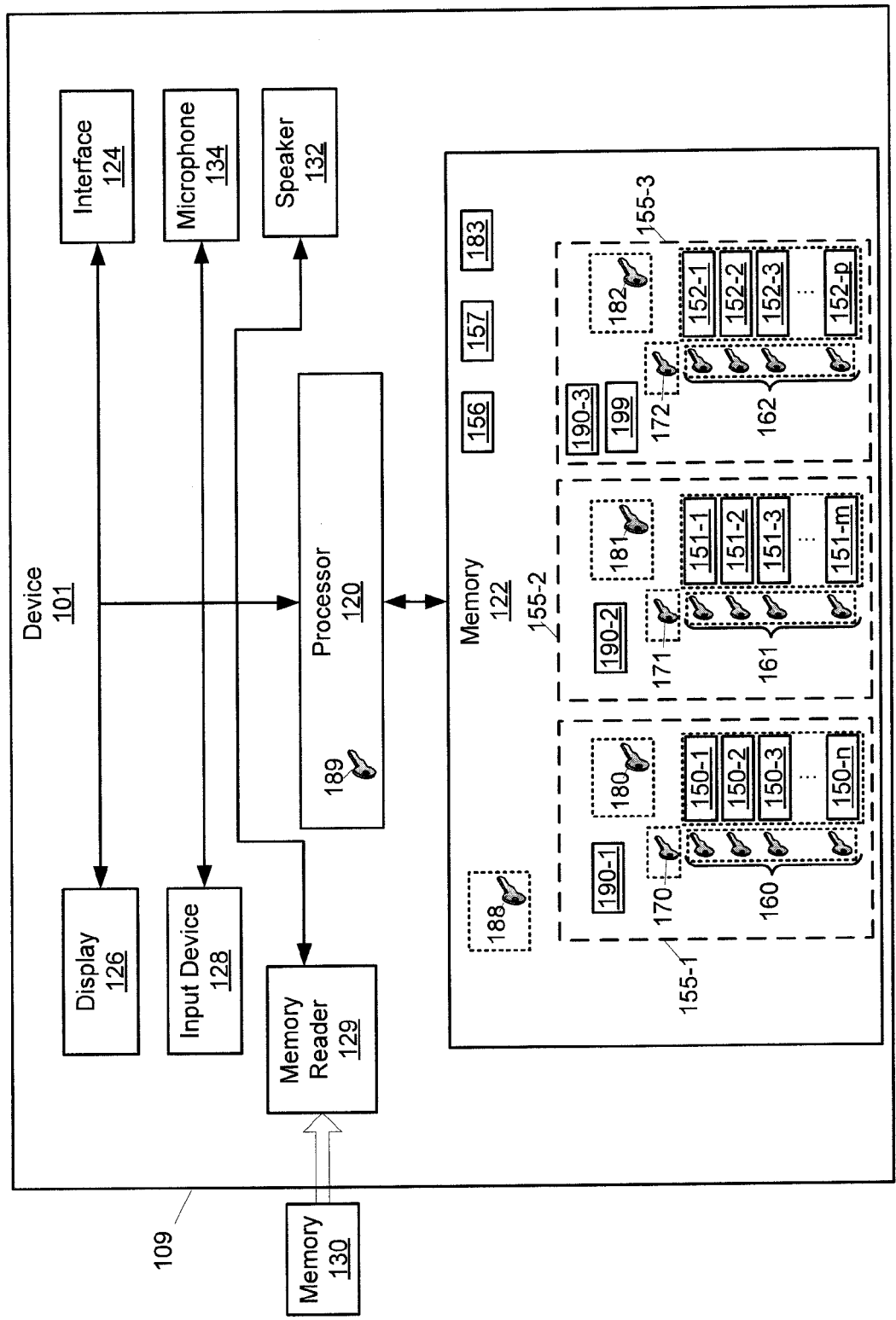
FIG. 1 depicts a device for controlling access to encrypted data, according to non-limiting implementations.

In general, this disclosure is directed to a device, and in particular a mobile electronic device, for controlling access to encrypted data stored thereupon. In general, mobile electronic devices represent electronic devices that are readily movable from place to place. In particular, data at such devices is encrypted to prevent the data from being accessed in the even the device is lost, stolen or the like. Further, the data can be organized into different categories that can include, for example, a "work" category of data pertaining to a business and/or a government entity that issued the device. In some devices, all "work" data is encrypted while at rest and is fully inaccessible when the device is powered off. After device reboot, however, all "work" data can be accessible due to an encryption key for the "work" data being automatically restored to memory after the device reboot, which can hence be usable by services that have sufficient permissions. Although accessing the data is controlled by data access policies, security conscious organizations are mindful of such key availability being a substantial attack vector. Hence, present implementations provided advanced protection control of access to data at the devices, including, but not limited to data categorized as sensitive, such sensitive data stored in a manner similar to the device being powered off, while still enabling the device and, "non-sensitive" data in the "work" space, to remain sufficiently accessible.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

In this specification, data may be described as being "accessible". In general, an element that is accessible is unencrypted, decrypted and/or an encryption key for decrypting the data is itself accessible and/or unencrypted and/or decrypted.

An aspect of the present specification provides a method comprising: controlling access to encrypted data, stored at a memory of a device, the encrypted data categorized according to a plurality of categories, using a respective encryption key for each category in the plurality of categories; and, controlling access to a given encryption key according to given criteria associated with a given category, respective criteria different for each respective category, access to the given encryption key including one or more of, when the respective criteria are met: generating the given encryption key and decrypting the given encryption key.

Access to the given encryption key may not be available until the given criteria is met.

The method can further comprise destroying the given encryption key once access to the given category of encrypted data occurs.

Each of the plurality of categories can be based on one or more of a ranking system, data sensitivity, operational needs of the device, and usability of the device.

The encrypted data can be partitioned at the memory based on the plurality of categories, each of the partitions can comprise one or more of a physical partition of the memory and a virtual partition.

Access to the given encryption key can comprise one or more of: decrypting the given encryption key using one or more of a system master key, a processor key, and data read from an external memory received in an external memory reader of the device; and generating the given encryption key from the data read from the external memory received in the memory reader.

The method can further comprise: decrypting, using the given encryption key, a given category encryption key previously generated when the given category was first generated; and, decrypting, using the given category key, one or more file encryption keys used to decrypt the encrypted data for the given category.

One of the plurality of categories of the encrypted data can comprise a start-up category, start-up encrypted data associated therewith used to start the device when the device is turned on and prior to receiving user input at an input device, start-up criteria associated with the start-up category can comprise determining that the device has been turned on, the start-up encrypted data can remain accessible once a master start-up encryption key is accessed after the start-up criteria is met, and the method can further comprise: decrypting, using the master start-up encryption key, at least one encryption key for decrypting the start-up encrypted data.

One of the plurality of categories of the encrypted data can comprise an operational category, operational encrypted data associated therewith used to one or more of: operate the device after the device is turned on; perform operations at the device; and provide a user an operational experience at the device, operational criteria associated with the operational category comprising: receiving input using an input device, that matches one or more of password data stored at the memory and PIN (personal identification number) data read from an external memory received in an external memory reader of the device, the operational encrypted data can remain accessible once a master operational encryption key is accessed after the operational criteria is met, and the method can further comprise: decrypting, using the master operational encryption key, at least one encryption key for decrypting the operational encrypted data.

One of the plurality of categories of the encrypted data can comprise a locked category of locked encrypted data, locked criteria associated with the locked category can comprise: receiving input using an input device, that matches one or more of password data stored at the memory and PIN (personal identification number) data read from an external memory received in an external memory reader of the device, once a master locked encryption key accessed after the locked criteria is met, and the method can further comprise: decrypting, using the master locked encryption key, at least one encryption key for decrypting the locked encrypted data; and, destroying the at least one encryption key when one or more locking trigger criteria are met such that the locked encrypted data is no longer accessible until the locked criteria is again met.

The locking trigger criteria can comprise one or more of: determining that a time-out period has occurred; receiving, at the device, a locking command from a server; receiving a locking command from applications running at the device; determining that an external memory has been removed from an external memory reader; and, determining that device is being one or more of turned off and powered down. The method can further comprise one or more of: controlling applications running at the device to transition to a reduced functionality state once the one or more locking trigger criteria are met; and, stopping the applications running at the device once the one or more locking trigger criteria are met.

Another aspect of the specification provides a device comprising: a processor and a memory, the processor configured to: control access to encrypted data, stored at the memory, the encrypted data categorized according to a plurality of categories, using a respective encryption key for each category in the plurality of categories; and, control access to a given encryption key according to given criteria associated with a given category, respective criteria different for each respective category, access to the given encryption key including one or more of, when the respective criteria are met: generating the given encryption key and decrypting the given encryption key.

Access to the given encryption key may not be available until the given criteria are met.

The processor can be further configured to destroy the given encryption key once access to the given category of encrypted data occurs.

Each of the plurality of categories can be based on one or more of a ranking system, data sensitivity, operational needs of the device, and usability of the device.

The encrypted data can be partitioned at the memory based on the plurality of categories, each of the partitions can comprise one or more of a physical partition of the memory and a virtual partition.

The processor can be further configured to provide access to the given encryption key by one or more of: decrypting the given encryption key using one or more of a system master key, a processor key, and data read from an external memory received in an external memory reader of the device; and generating the given encryption key from the data read from the external memory received in the memory reader.

The processor can be further configured to: decrypt, using the given encryption key, a given category encryption key previously generated when the given category was first generated; and, decrypt, using the given category key, one or more file encryption keys used to decrypt the encrypted data for the given category.

One of the plurality of categories of the encrypted data can comprise a start-up category, start-up encrypted data associated therewith used to start the device when the device is turned on and prior to receiving user input at an input device, start-up criteria associated with the start-up category can comprise determining that the device has been turned on, the start-up encrypted data can remain accessible once a master start-up encryption key is accessed after the start-up criteria is met, and the method can further comprise: decrypting, using the master start-up encryption key, at least one encryption key for decrypting the start-up encrypted data.

One of the plurality of categories of the encrypted data can comprise an operational category, operational encrypted data associated therewith used to one or more of: operate the device after the device is turned on; perform operations at the device; and provide a user an operational experience at the device, operational criteria associated with the operational category comprising: receiving input using an input device, that matches one or more of password data stored at the memory and PIN (personal identification number) data read from an external memory received in an external memory reader of the device, the operational encrypted data can remain accessible once a master operational encryption key is accessed after the operational criteria is met, and the method can further comprise: decrypting, using the master operational encryption key, at least one encryption key for decrypting the operational encrypted data.

One of the plurality of categories of the encrypted data can comprise a locked category of locked encrypted data, locked criteria associated with the locked category can comprise: receiving input using an input device, that matches one or more of password data stored at the memory and PIN (personal identification number) data read from an external memory received in an external memory reader of the device, once a master locked encryption key accessed after the locked criteria is met, and the method can further comprise: decrypting, using the master locked encryption key, at least one encryption key for decrypting the locked encrypted data; and, destroying the at least one encryption key when one or more locking trigger criteria are met such that the locked encrypted data is no longer accessible until the locked criteria is again met.

The locking trigger criteria can comprise one or more of: determining that a time-out period has occurred; receiving, at the device, a locking command from a server; receiving a locking command from applications running at the device; determining that an external memory has been removed from an external memory reader; and, determining that the device is being one or more of turned off and powered down. The processor can be further configured to one or more of: control applications running at the device to transition to a reduced functionality state once the one or more locking trigger criteria are met; and, stop the applications running at the device once the one or more locking trigger criteria are met.

A further aspect of the specification provides a computer program product, comprising a computer readable program code adapted to be executed to implement a method comprising: controlling access to encrypted data, stored at a memory of a device, the encrypted data categorized according to a plurality of categories, using a respective encryption key for each category in the plurality of categories; and, controlling access to a given encryption key according to given criteria associated with a given category, respective criteria different for each respective category, access to the given encryption key including one or more of, when the respective criteria are met: generating the given encryption key and decrypting the given encryption key. The computer usable medium can comprise a non-transitory computer usable medium.

FIG. 1 depicts a device 101 for controlling access to encrypted data. Device 101 comprises a housing 109, which houses a processor 120 interconnected with a memory 122, a communications interface 124, a display 126, and an input device 128, and optionally an external memory reader 129 (configured to receive an external memory 130), a speaker 132, and a microphone 134. Communications interface 124 will be interchangeably referred to as interface 124. Device 101 further stores encrypted data 150-1, 150-2, 150-3 . . . 150-$n$, 151-1, 151-2, 151-3 . . . 151-$m$, 152-1, 152-2, 152-3 . . . 152-$p$ at memory 122. Data 150-1, 150-2, 150-3 . . . 150-$n$ will also be referred to hereafter collectively and generically as data 150, data 151-1, 151-2, 151-3 . . . 151-$m$ will also be referred to hereafter collectively and generically as data 151, and data 152-1, 152-2, 152-3 . . . 152-$p$ will also be referred to hereafter collectively and generically as data 152. Each of data 150, 151, 152 can comprise data files, messages, email, calendar data, PIM (personal information manager) data, applications and the like. Memory 122 further stores an application 156 for controlling access to encrypted data 150, 151, 152. In some implementations, as depicted memory 122 further stores one or more applications 157 that use encrypted data 150, and/or encrypted data 151 and/or encrypted data 152 to operate and/or access and/or function, once encrypted data 150, and/or encrypted data 151 and/or encrypted data 152 is unencrypted, as described below.

A number of "n" sets of data 150, a number "m" sets of data 151, and a number "p" sets of data 152; "n", "m", and "p" can each be the same or different; indeed there is generally no correlation between the numbers "n", "m" and "p".

Further, data 150, 151, 152 is categorized according to a plurality of categories 155-1, 155-2, 155-3, which are delineated in FIG. 1 by broken lines. Plurality of categories 155-1, 155-2, 155-3 will be collectively referred to hereafter as categories 155, and generically as a category 155. Further, while three categories 155 are depicted, any number of categories is within the scope of present implementations.

Further, data associated with each of categories 155 is not limited to respective encrypted data 150, 151, 152; rather other types of data can be associated with each category 155, including, but not limited to, respective encryption keys, respective criteria and the like, as described hereafter. Each category 155 can also be referred to as a "domain" and can be distinguished from each other at memory 122 via one or more of physical partitioning of memory 122 and/or virtual partitions at memory 122. In other words, encrypted data 150, 151, 152 can be partitioned at memory 122 based on the plurality of categories 155, each of the partitions comprising one or more of a physical partition of memory 122 and a virtual partition. Alternatively, encrypted data 150, 151, 152 can be categorized using one or more of labels, metadata and the like. Each category 155 and/or partition and/or virtual partition can further comprise associated keys and criteria, as described hereafter.

In a non-limiting example, one of the plurality of categories 155 of encrypted data, for example category 155-1 and/or data 150, can comprise a start-up category, start-up encrypted data 150 associated therewith used to start device 101 when device 101 is turned on and/or powered up. Another one of the plurality of categories 155 of encrypted data, for example category 155-2 and/or data 151, can comprise an operational category, operational encrypted data 151 associated therewith used to one or more of: operate device 101 after device 101 is turned on; perform operations at device 101; and provide a user of device 101 an operational experience at device 101. Another one of the plurality of categories 155 of encrypted data, for example category 155-3 and/or data 152, can comprise a locked category of locked encrypted data 152. Each of these categories will be described in more detail below, however locked data 152 can comprise one or more of sensitive data and/or data associated with an enterprise operating and/or issuing and/or controlling device 101, such as a government or business; hence, locked data 152 can comprise data that is considered particularly sensitive to the enterprise. In some implementations locked category 155-3 can be referred to as a work domain as category 155-3 can comprise data, associated with an entity that employs a user of device 101, that can be characterized as "sensitive" data by the entity.

In some implementations, the plurality of categories 155 can be ranked, for example according to sensitivity of data 150, 151, 152 associated with each category 155. Hence, each of the plurality of categories 155 can be based on one or more of a ranking system, data sensitivity, operational needs of device 101, and usability of device 101.

In any event, each of data 150, 151, 152 can be unencrypted with a respective key 160, 161, 162 respective to each set of data 150, 151, 152. Each of keys 160, 161, 162 can comprise a symmetric encryption key including, but not limited to a 256 bit symmetric encryption key, which can be randomly generated when a respective set of data 150, 151, 152 is generated. Each of keys 160, 161, 162 can hence also be referred to as a file encryption key ("FEK"), and stored, encrypted (as described below) as a metadata attribute of associated encrypted data 150, 151, 152.

Keys 160, 161, 162, can be in a one-to-one relationship with data 150, 151, 152. In other words, there can be a respective key 160 for each of data 150-1, 150-2, 150-3 . . . 150-$n$ (i.e. a number "n" sets of data 150, and a number "n" keys 160), a respective key 161 for each of data 151-1, 151-2, 151-3 . . . 151-$n$ (i.e. a number "m" sets of data 151, and a number "m" keys 161), and a respective key 162 for each of data 152-1, 152-2, 152-3 . . . 152-$n$ (i.e. a number "p" sets of data 152, and a number "p" keys 162). Hence the term key 160 refers to a set of "n" keys 160, the term keys 161 refers to a set of "m" keys 161, and the term keys 162 refers to a set of "p" keys 162.

In FIG. 1, data 150, 151, 152 being encrypted are designated by dashed lines surrounding each of encrypted data 150, 151, 152, which is distinct from the broken lines delineating each category 155.

Further, each of keys 160, 161, 162 is encrypted using a respective encryption key 170, 171, 172 associated with each category 155; keys 160, 161, 162 being encrypted is designated by dashed lines surrounding each of keys 160, 161, 162, which is distinct from the broken lines delineating each category 155.

Each of keys 170, 171, 172 can comprise a symmetric encryption key including, but not limited to a 256 bit symmetric encryption key, which can be randomly generated when a respective category 155 is first generated. Each of keys 170, 171, 172 can hence also be referred to as a "domain" key. Each of domain keys 170, 171, 172 can include, but is not limited to an AES (Advanced Encryption Standard) key, implemented using CBC (cipher-block chaining), XTS (ciphertext stealing) and the like, but other types of encryption keys are within the scope of present implementations.

Further, each of domain keys 170, 171, 172 is encrypted using a respective encrypted master key 180, 181, 182 associated with each category 155; keys 170, 171, 172 being encrypted is designated by dashed lines surrounding each of keys 170, 171, 172, which is distinct from the broken lines delineating each category 155.

The process of unencrypting domain keys 170, 171, 172 can colloquially be referred to as "unlocking a domain", and the process of deleting unencrypted domain keys 170, 171, 172 can colloquially be referred to as "locking a domain".

Hence, memory 122 can further store an encrypted master key 180, 181, 182 associated with each category 155. For example encrypted master key 180 is associated with category 155-1, encrypted master key 181 is associated with category 155-2, and encrypted master key 182 is associated with category 155-3. Hence, encrypted master keys 180, 181, 182 can also be referred to as encrypted domain master keys 180, 181, 182.

Each of encrypted domain master keys 180, 181, 182 can comprise a symmetric encryption key including, but not limited to a 512 bit symmetric encryption key. Each of encrypted domain master keys 180, 181, 182 can include, but is not limited to an AES (Advanced Encryption Standard) key, implemented using CBC (cipher-block chaining), XTS (ciphertext stealing) and the like, but other types of encryption keys are within the scope of present implementations.

However, one or more of encrypted domain master keys 180, 181, 182 can be generated, as needed, using input received at input device 128, for example one or more of password data and/or personal identification number (PIN) data that matches one or more of password data stored at device 101 and PIN data stored at external memory 130, presuming that external memory 130 has been received in external memory reader 129. While the password data and/or PIN data stored at device 101 and/or external memory 130 is not depicted, it is appreciated to be nonetheless present.

In these implementations, device 101 further stores an algorithm 183 for generating domain master keys 180, 181, 182 from input received at input device 128. In other words, input received at input device 128 and/or external memory reader 129 (such as a password and/or PIN) is input to algorithm 183 and algorithm 183 outputs an unencrypted version of a domain master key 180, 181, 182. In other words, without the appropriate input (i.e. a password and/or PIN) a respective domain master keys 180, 181, 182 cannot be generated. Algorithm 183 can further receive, as input for generating one or more domain master keys 180, 181, 182, system master key 188, which can be concatenated with the password and/or PIN. For example, algorithm 183 can comprise an algorithm for generating hashes and the like. Algorithm 183 can further comprise further operations on output of algorithm 183, and/or intermediate output of algorithm 183, in order to generate one or more of domain master keys 180, 181, 182.

In implementations where the password and/or PIN is used to generate one or more domain master keys 180, 181, 182, a respective domain master key 180, 181, 182 can be changed when the password and/or PIN is changed.

Encrypted domain master keys 180, 181, 182 being encrypted, and/or not yet generated, is designated by dashed lines surrounding each of encrypted domain master keys 180, 181, 182, which is distinct from the broken lines delineating each category 155.

When encrypted domain master keys 180, 181, 182 are not generated, as needed, encrypted domain master keys 180, 181, 182 can be accessed (i.e. decrypted) using a system master key 188 stored at memory 122, which is in turn encrypted using a processor key 189 stored at processor 120.

Processor key 189 can be embedded at processor 120 during manufacture and is protected from external access via security features at processor 120. Processor key 189 can comprise a symmetric key including, but not limited to, a 128 bit key, a 256 bit key, an AES key, an AES CBC key, an AES XTS key and the like.

System master key 188 can comprise a symmetric key including, but not limited to, a 256 bit key, an AES key, an AES CBC key, an AES XTS key and the like. System master key 188 is generally decrypted upon one or more of an initial boot of device 101 and when device 101 is turned on, and persists (i.e. remains unencrypted) thereafter, until device 101 is turned off, and/or a battery pull occurs. In other words, system master key 188 is encrypted while device 101 is in an off state, and/or prior to an initial boot of device 101.

Access to domain master keys 180, 181, 182 comprises one or more of: decrypting one or more domain master keys 180, 181, 182 using one or more of system master key 188 and processor key 189 (i.e. processor key 189 decrypts system master key 188 which in turn can be used to decrypt one or more of domain master keys 180, 181, 182); and generating domain master keys 180, 181, 182 from input data received at input device 128 of device 101, for example using algorithm 183, as described above.

Further, domain master keys 180, 181, 182 are destroyed once access to an associated category 155 of encrypted data 150, 151, 152 occurs; in other words, decrypted and/or generated domain master keys 180, 181, 182 are deleted from memory 122 once associated domain keys 170, 171, 172 are decrypted. Hence, domain master keys 180, 181, 182 are generally only stored in an unencrypted state at device 101 for short periods of time, for example a time from decrypting a domain master key 180, 181, 182 to a time that a respective domain key 170, 171, 172 is decrypted.

Indeed, encrypted keys 160, 161, 162, 170, 171, 172, and 189 generally persist at memory 122, and, when unencrypted, a copy of the unencrypted keys 160, 161, 162, 170, 171, 172, and 189 persist at memory 122 only under certain conditions and/or criteria.

For example, as described above, the unencrypted version of system master key 188 is destroyed and/or deleted in memory 122 when device 101 is turned off and the like. Domain keys 170, 171, 172 generally persist in memory 122 only when an associated category 155 is unlocked; locking the associated category 155 and/or domain results in the unencrypted versions of the domain keys 170, 171, 172 being deleted from memory 122. Similarly, unencrypted versions of keys 160, 161, 162 can persist only when associated data 150, 151, 152 is being accessed, and can be deleted thereafter.

In general, access to each domain master keys 180, 181, 182 is controlled according to criteria 190-1, 190-2, 190-3 associated with a respective category 155. Criteria 190-1, 190-2, 190-3 will be described in further detail below, and will be hereafter referred to, collectively and generically, as criteria 190. When given criteria 190 is met, an associated domain master key 180, 181, 182 is decrypted and/or generated, and then the unencrypted and/or generated version is destroyed once an associated category 155 and/or domain is unlocked.

Furthermore, one or more categories 155 and/or domains can be locked when associated locking trigger criteria 199 are met; in depicted implementations, only category 155-3 is associated with locking trigger criteria 199, though it is implicit that categories 155-1, 155-2 are to be locked when device 101 is turned off, powered down, and the like. Otherwise categories 155-1, 155-2 remain unlocked once respective domain keys 170-1, 170-2 are unencrypted.

Locking trigger criteria 199 for category 155-3 can include, but is not limited to: determining that a time-out period has occurred; receiving, at the device, a locking command from a server (not depicted, but device 101 can be in communication with a server via interface 124); receiving a locking command from applications running at device 101; determining that external memory 130 has been removed from external memory reader 129; determining that device 101 is being one or more of turned off and powered down, and the like.

In any event, in order to control access to domains/categories 155, processor 120 is generally configured to: control access to encrypted data 150, 151, 152, stored at memory 122 of device 101, encrypted data 150, 151, 152 categorized according to a plurality of categories 155, using a respective encryption key 180, 181, 182 for each category 155 in the plurality of categories 155; and, control access to a given encryption key 180, 181, 182 according to given criteria 190 associated with a given category 155, respective criteria 190 different for each respective category 155, access to the given encryption key 180, 181, 182 including one or more of, when the respective criteria 190 are met: generating the given encryption key 180, 181, 182 and decrypting the given encryption key 180, 181, 182.

Further, as depicted in FIG. 1, device 101 is in an off-state as all data 150, 151, 152 is encrypted and all keys 160, 161, 162, 170, 171, 172, 180, 181, 182, 188 are encrypted; hence device 101 is in a secure state.

Figure 2:
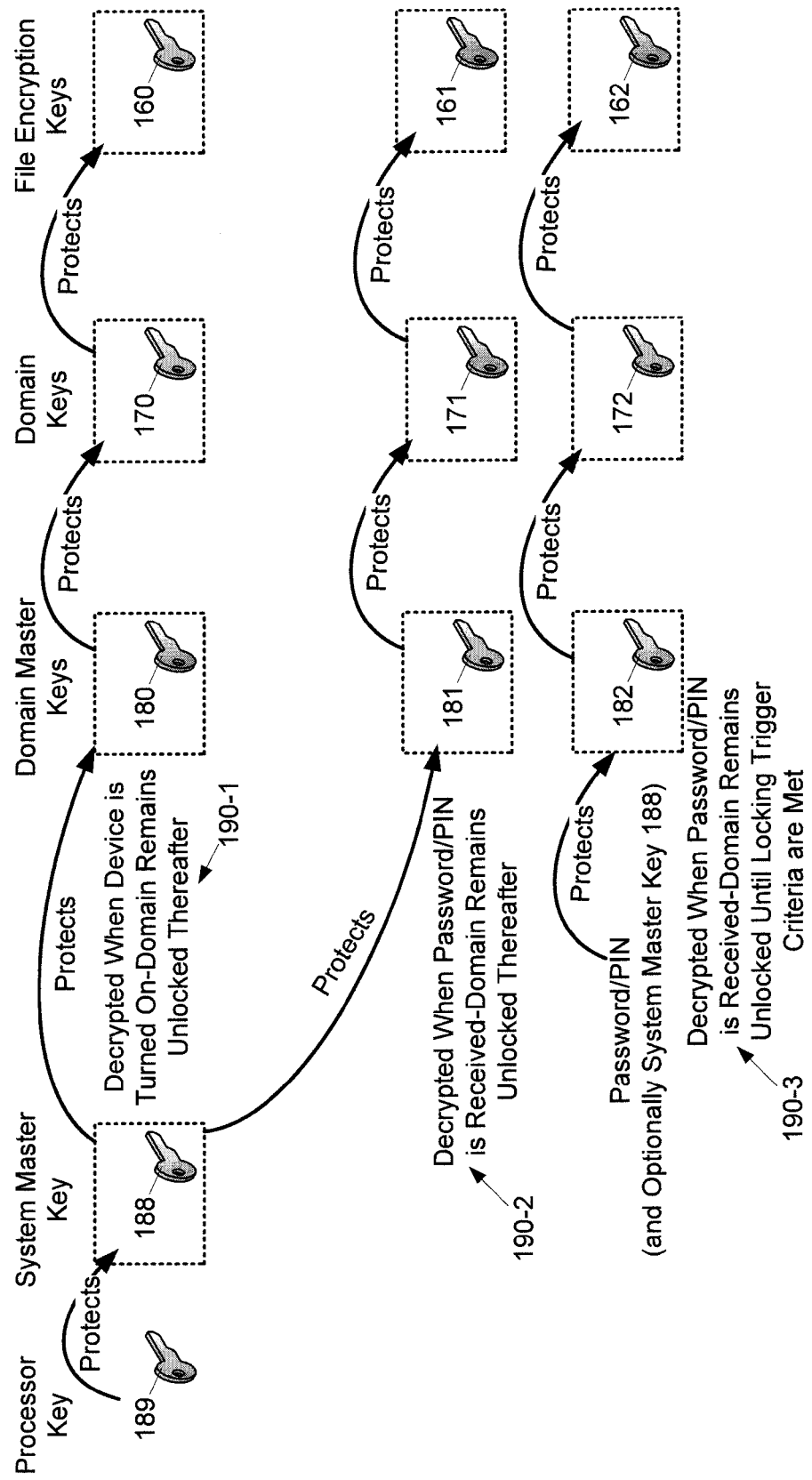
FIG. 2 depicts relationships between encryption keys and criteria for gaining access thereto, according to non-limiting implementations.

A non-limiting example of the relationship between the various keys 160, 161, 162, 170, 171, 172, 180, 181, 182, 188, 189 described above, as well as example criteria 190 is depicted in FIG. 2. Processor key 189, which is protected in processor 120, protects system master key 188 (i.e. processor key 189 decrypts system master key 188). System master key 188 protects domain master keys 180, 181, and a password and/or PIN (and optionally system master key 188, as described above) protects domain master key 182; in other words, system master key 188 decrypts system domain master keys 180, 181, while a password and/or PIN is used to generate domain master key 182.

Domain master key 180 protects domain key 170, which in turn protects file encryption keys 160; domain master key 181 protects domain key 171, which in turn protects file encryption keys 161; and, domain master key 182 protects domain key 172, which in turn protects file encryption keys 162.

As described above, once a respective domain key 170, 171, 172 is decrypted by a respective unencrypted domain master key 180, the respective unencrypted domain master key 180 is destroyed and/or deleted from memory 122.

Further, criteria 190 for each category 155 and/or domain are different.

For example, one of the plurality of categories 155 of encrypted data 150 can comprise a start-up category 155-1, start-up encrypted data 151 associated therewith used to start device 101 when device 101 is turned on, and hence start-up criteria 190-1 associated with the start-up category 155-1 comprises determining that device 101 has been turned on. Further, start-up encrypted data 150 remains accessible once a master start-up encryption key 180 is accessed after the start-up criteria is met (i.e. start-up category 155-1 and/or the start-up domain remains unlocked while device 101 remains turned on). These implementations include decrypting, using master start-up encryption key 180, at least one encryption key 170, 160 for decrypting the start-up encrypted data 150, which can include decrypting domain key 170, which is in turn used to decrypt file encryption keys 160, which in turn are used to decrypt start-up data 151.

Another one of the plurality of categories 155 of encrypted data 151 can comprise an operational category 155-2, operational encrypted data 151 associated therewith used to one or more of: operate device 101 after device 101 is turned on; perform operations at device 101; and provide a user an operational experience at device 101. Operational criteria 190-2 associated with operational category 155-2 can comprise: receiving input using input device 128 which matches one or more of password data stored at device 101 and PIN data read from external memory 130 received in external memory reader 129 of device 101. The operational encrypted data 150-2 remain accessible once master operational encryption key 181 is accessed after operational criteria 190-2 is met (i.e. operational category 155-2 and/or the operational domain remains unlocked while device 101 remains turned on and after password data and/or PIN data is received and a match is found). These implementations include: decrypting, using master operational encryption key 181, at least one encryption key 161, 171 for decrypting operational encrypted data 152, which can include decrypting domain key 171, which is in turn used to decrypt file encryption keys 161, which in turn are used to decrypt operational data 151. Further, in implementations where the input received at input device 128 matches the PIN data read from external memory 130, the matching results in unlocking of external memory 130, which can also store data and/or an algorithm for decrypting and/or generating and/or accessing a master operational key 181.

Another one of the plurality of categories 155 of encrypted data 152 can comprise a locked category 155-3 of locked encrypted data 152, locked criteria 190-3 associated with locked category 155-3 comprising: receiving input using input device 128 that matches one or more of password data stored at device 101 and PIN (personal identification number) data read from external memory 130 received in external memory reader 129 of device 101. Once a master locked encryption key 182 is accessed after locked criteria 190-3 is met, these implementations further comprise: decrypting, using the master locked encryption key 182, at least one encryption key 162, 172 for decrypting locked encrypted data 151; and, destroying the at least one encryption key 182 (i.e. an unencrypted version thereof) when one or more locking trigger criteria 199 are met such that locked encrypted data 151 is no longer accessible until locked criteria 190-3 is again met. Further, in implementations where the input received at input device 128 matches the PIN data read from external memory 130, the matching results in unlocking of external memory 130, which can also store data and/or an algorithm for decrypting and/or generating and/or accessing a master operational key 182.

Further, when any of one or more applications 157 rely on encrypted data 152 being accessible to operate, processor 120 can control the one or more applications 157 running at device 101, transition to a reduced functionality state (e.g. a locked state) once the one or more locking trigger criteria 199 are met; and/or stop the one or more applications 157 running at device 101 once the one or more locking trigger criteria 199 are met. In transitioning the one or more applications 157 to either transition to a locked state and/or stop, the applications 157 enter a mode where encrypted data 152 is not accessed, thereby preventing the applications 157 from crashing and the like. For example, a locked state of an application 157 can comprise a reduced functionality state, operating with a subset of functionality (i.e. due to data 152 being inaccessible), where application 157 does not shut down and/or stop, but waits until locked criteria 190-3 is again met and encrypted data 152-3 is again accessible. Applications 157 that transition to a locked state can colloquially be referred to as being "aware" applications that are configured to run in a reduced functionality state when data 152 is not accessible. Applications 157 that are stopped can colloquially be referred to as being "unaware" applications that are not configured to run in a reduced functionality state when data 152 is not accessible.

Differences between start-up data 150, operational data 151 and locked data 152 can be understood with regard to a non-limiting example of a calendar program which starts automatically when device 101 is turned on. In these implementations, start-up data 150 can include data for starting the calendar program, such as an executable file, data for formatting a calendar at display 126, font data and the like. Operational data 151 can comprise data indicating whether given time periods in the calendar is free or busy and/or other non-sensitive data. Locked data 152 can comprise details of meetings, events, and the like, that occur in each of the busy time periods that can include sensitive data that could be of use to a hacker and/or a competitor of an entity associated with device 101. An administrator, a programmer, and the like, can determine whether data is to be classified as start-up data, operational data or locked data.

Further, while three categories 155 have been described, other categories 155 are within the scope of present implementations. For example, some implementations can include one or more applications categories and/or domains that include data, and associated keys and criteria, and optionally locking trigger criteria, for one or more of applications 157, in which respective categories are locked under different conditions, such as receiving a locking command from a respective application. Other implementations can include one or more remote entity categories and/or domains that includes data, and associated keys and criteria, and optionally locking trigger criteria, for one or more of applications running at a remote server (for example in tandem with a client application at device 101), in which respective categories are locked under different conditions, such as receiving a locking command from the remote server. Yet further implementations can include a "personal" category that comprises data associated with a user of device 101 but not a business entity associated therewith; the sensitivity of data in the "personal" category can be ranked between operational data 151 and locked data 152. However, such rankings can be optional. Further, data within each category of data can be, itself, ranked and domains associated with each ranking within each category, which can include respective criteria for unlocking/decrypting data in each sub-category.

It is appreciated that FIG. 1 further depicts a schematic diagram of device 101, which will hereafter be described in further detail. It should be emphasized that the structure of device 101 in FIG. 1 is purely an example. For example, as depicted in FIG. 1, it is contemplated that device 101 comprises a device that can be used for implementing both wireless voice (e.g. telephony) and wireless data communications (e.g. email, web browsing, text, and the like), as well as any other specialized functions, including, but not limited to one or more of, computing, and/or entertainment related functions.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a type of device 101. In general, housing 109 encloses or houses the components of device 101; however some components can be visible via apertures, windows and the like in housing 109. For example, display 126 is generally visible.

At least one input device 128 is generally configured to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations, including, but not limited to, external memory reader 129, and near field communication (NFC) reader, and the like. In some implementations, password data and/or PIN data can be received from an NFC device using the NFC reader.

Input from input device 128 is received at processor 120 (which can be implemented as a plurality of processors, including but not limited to one or more central processing units (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

In particular, it is appreciated that memory 122 stores an application 156, that, when processed by processor 120, enables processor 120 to: control access to encrypted data 150, 151, 152, stored at memory 122 of device 101, encrypted data 150, 151, 152 categorized according to a plurality of categories 155, using a respective encryption key 180, 181, 182 for each category 155 in the plurality of categories 155; and, control access to a given encryption key 180, 181, 182 according to given criteria 190 associated with a given category 155, respective criteria 190 different for each respective category 155, access to the given encryption key 180, 181, 182 including one or more of, when the respective criteria 190 are met: generating the given encryption key 180, 181, 182 and decrypting the given encryption key 180, 181, 182.

Processor 120 can be further configured to communicate with display 126, and optional microphone 134 and optional speaker 132. Display 126 comprises one or more of a flat panel display, an LCD (liquid crystal display), a plasma display, an OLED (organic light emitting diode) display, a capacitive touchscreen, a resistive touch screen, a CRT (cathode ray tube) display, and the like. Optional microphone 134 comprises a microphone for receiving sound data at device 101. Optional speaker 132 comprises a speaker for providing sound data, audible alerts, audible communications from remote communication devices, and the like, at device 101. Processor 120 can also control one or more of display 126 and optional speaker 132 to provide notifications. In some implementations, device 101 can further comprise an indicator and/or notification device (not depicted), for example an LED (light emitting diode), a light and the like that can also be configured to provide notifications.

Interface 124 (and/or another communications interface, not depicted) can be implemented as one or more radios and/or connectors and/or network adaptors, configured to wirelessly communicate with one or more communication networks (not depicted) and/or wireless communication networks and/or wired communication networks and/or wireless transceivers. It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like), wireless data, Bluetooth™ links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas there for (not depicted). In some implementations, however, interface 124 can be optional.

Optional external memory reader 129 and external memory 130 can respectively include, but are not limited to, combinations of a card reader and a card, a smart card reader and a smart card, and the like. Further, as described above, external memory 130 can store a PIN and/or algorithms for decrypting and/or generating domain master keys 180, 181, 182, and external memory reader 129 can read the PIN and/or algorithms, which are then available to processor 120 for decrypting and/or generating domain master keys 180, 181, 182. External memory reader 129 is hence configured to receive external memory 130, and further external memory 130 is configured to be removabley insertable in external memory reader 129. In some implementations, data stored at external memory 130 is locked and/or encrypted and is not unlocked and/or decrypted until input data that matched the PIN is received at input device 128.

While not depicted, device 101 further comprises power source which can include, but is not limited to, a battery, a power pack, and the like.

It should be understood that a wide variety of configurations for device 101 are contemplated.

Attention is now directed to FIG. 3 which depicts a flowchart illustrating a method 300 for controlling access to encrypted data, according to non-limiting implementations. In order to assist in the explanation of method 300, it will be assumed that method 300 is performed using device 101. Furthermore, the following discussion of method 300 will lead to a further understanding of device 101 and its various components. However, it is to be understood that device 101, and/or method 300 can be varied, and need not work exactly as discussed herein in conjunction with each other, and that such variations are within the scope of present implementations. It is appreciated that, in some implementations, method 300 is implemented in device 101 by processor 120, for example by implementing application 156.

It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood that method 300 can be implemented on variations of device 101 as well.

At block 301, processor 120 controls access to encrypted data 150, 151, 152, stored at memory 122 of device 101, encrypted data 150, 151, 152 categorized according to a plurality of categories 155, using a respective encryption key 180, 181, 182 for each category 155 in the plurality of categories 155. Such control to encrypted data 150, 151, 152 can include, but is not limited to, encrypting and decrypting data 150, 151, 152 using keys 160, 161, 162 etc. when data 150, 151, 152 is to be accessed by an application 157 and the like.

At block 303, processor 120 controls access to a given encryption key 180, 181, 182 according to given criteria 190 associated with a given category 155, respective criteria 190 different for each respective category 155, access to the given encryption key 180, 181, 182 including one or more of, when the respective criteria 190 are met: generating the given encryption key 180, 181, 182 and decrypting the given encryption key 180, 181, 182. For example, as described above, access to a given encryption key 180, 181, 182 is not available until given criteria 190 is met. Further, as also described above, access to the given encryption key comprises one or more of: decrypting the given category encryption key 180, 181, 182 using one or more of a system master key 188 and a processor key 189, and generating the given encryption key 180, 181, 182 from input data received at input device 128 of device 101.

Block 303 can further comprise: decrypting, using the given encryption key 180, 181, 182, a given category encryption key 170, 171, 172 previously generated when the given category 155 was first generated; and, decrypting, using the given category encryption key 170, 171, 172, one or more file encryption keys 160, 161, 162 used to decrypt the encrypted data 150, 151, 152 for the given category 155.

At block 305, processor 120 destroys the given encryption key 180, 181, 182 once access to the given category 155 of encrypted data 150, 151, 152 occurs. For example an unencrypted version of the given encryption key 180, 181, 182 is deleted, though an encrypted version of given encryption key 180, 181, 182 persists at memory 122 and/or can again be generated using the key generation algorithm 183.

Various aspects of method 300 will be described with respect to FIGS. 4 to 9, each of which is substantially similar to FIG. 1, with like elements having like numbers. In each of FIGS. 4 to 9, a given key being decrypted and/or generated at memory 122 will be indicated by a removal of the dotted lines that surround the given key, though it is appreciated that an encrypted version of the given key persists at memory 122 and/or the given key can again be generated using algorithm 183. Removal of dotted lines that surround the given key can also indicate that the unencrypted version of the given key is located in a volatile portion of memory 122, while an encrypted version of the given key can persist in a non-volatile portion of memory 122.

Figure 4:
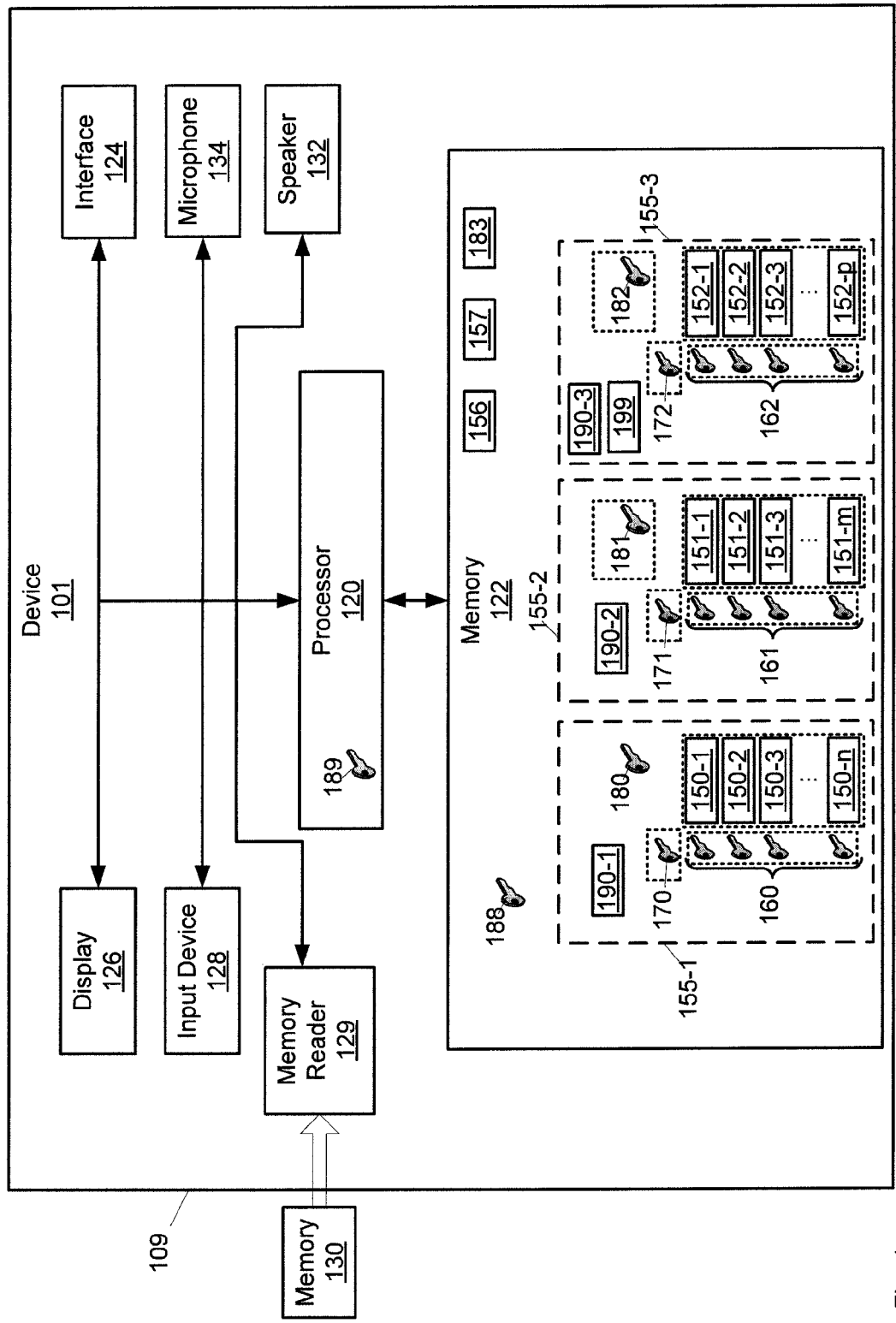
FIG. 4 depicts the device of FIG. 1 after start-up, according to non-limiting implementations.

Attention is next directed to FIG. 4, which depicts device 101 upon start-up, and hence processor key 189 has been used to decrypt system master key 188. The decrypted version of system master key 188 can be destroyed when device 101 powers down. Further, start-up domain master key 180 has been decrypted using system master key 188, and the decrypted version of start-up domain master key 180 can be destroyed when associated domain key 170 is decrypted using start-up domain master key 180.

Figure 5:
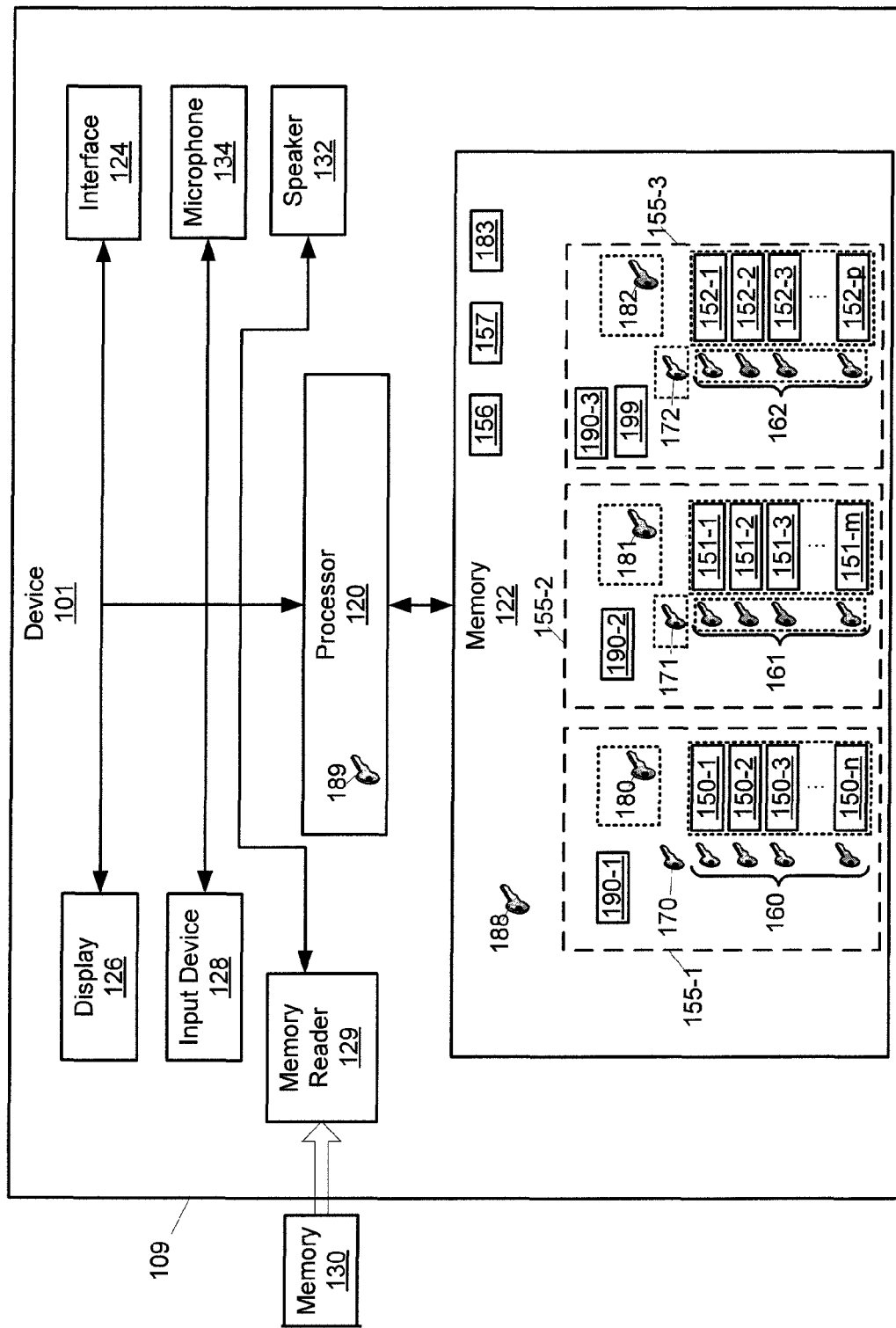
FIG. 5 depicts the device of FIG. 1 after a start-up category has been unlocked, according to non-limiting implementations.

For example, attention is next directed to FIG. 5 which depicts device 101 after start-up domain master key 180 is used to decrypt domain key 170: the unencrypted version of start-up domain key 180 is destroyed, while the encrypted version of start-up domain key 180 persists at memory 122. Further, domain key 170 has been used to decrypt file encryption keys 160. Domain key 170 and file encryption keys 160 remain accessible while device 101 remains on.

In some implementations, file encryption keys 160 are not decrypted when domain key 170 is decrypted; rather a given file encryption key 160 can be decrypted using domain key 170 when an associated set of data 150 is to be accessed, for example by an application 157.

Figure 6:
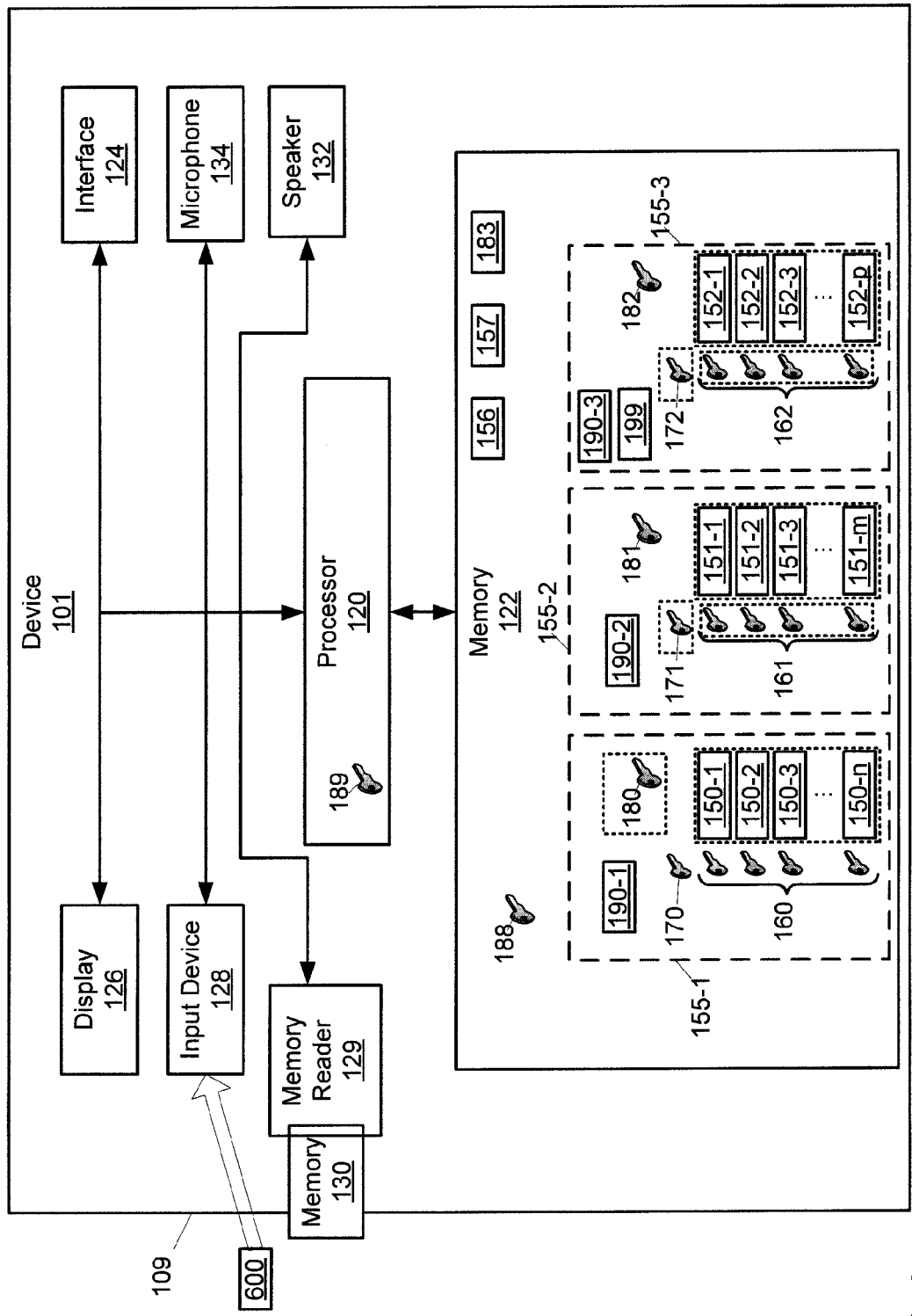
FIG. 6 depicts the device of FIG. 1 after an initial authentication, according to non-limiting implementations.

Attention is next directed to FIG. 6 which depicts input data 600 being received at input device 128, input data 600 including, but not limited to password data and/or PIN data, that matches password data and/or PIN data stored at memory 122 and/or external memory 130 (i.e. external memory 130 has been received in external memory reader 129). In any event, receipt of input data 600 results in domain master keys 181, 182 being made accessible either by decrypting one or more of domain master keys 181, 182 using system master key 189 and/or by generating one or more of domain master keys 181, 182 using algorithm 183. As described above, category 155-2 can comprise an operational category and category 155-3 can comprise a locked category, hence, domain master keys 181, 182 can respectively comprise an operational domain master key and a locked domain master key. The domain master keys 181, 182 are then used to respectively decrypt domain keys 171, 172.

Figure 7:
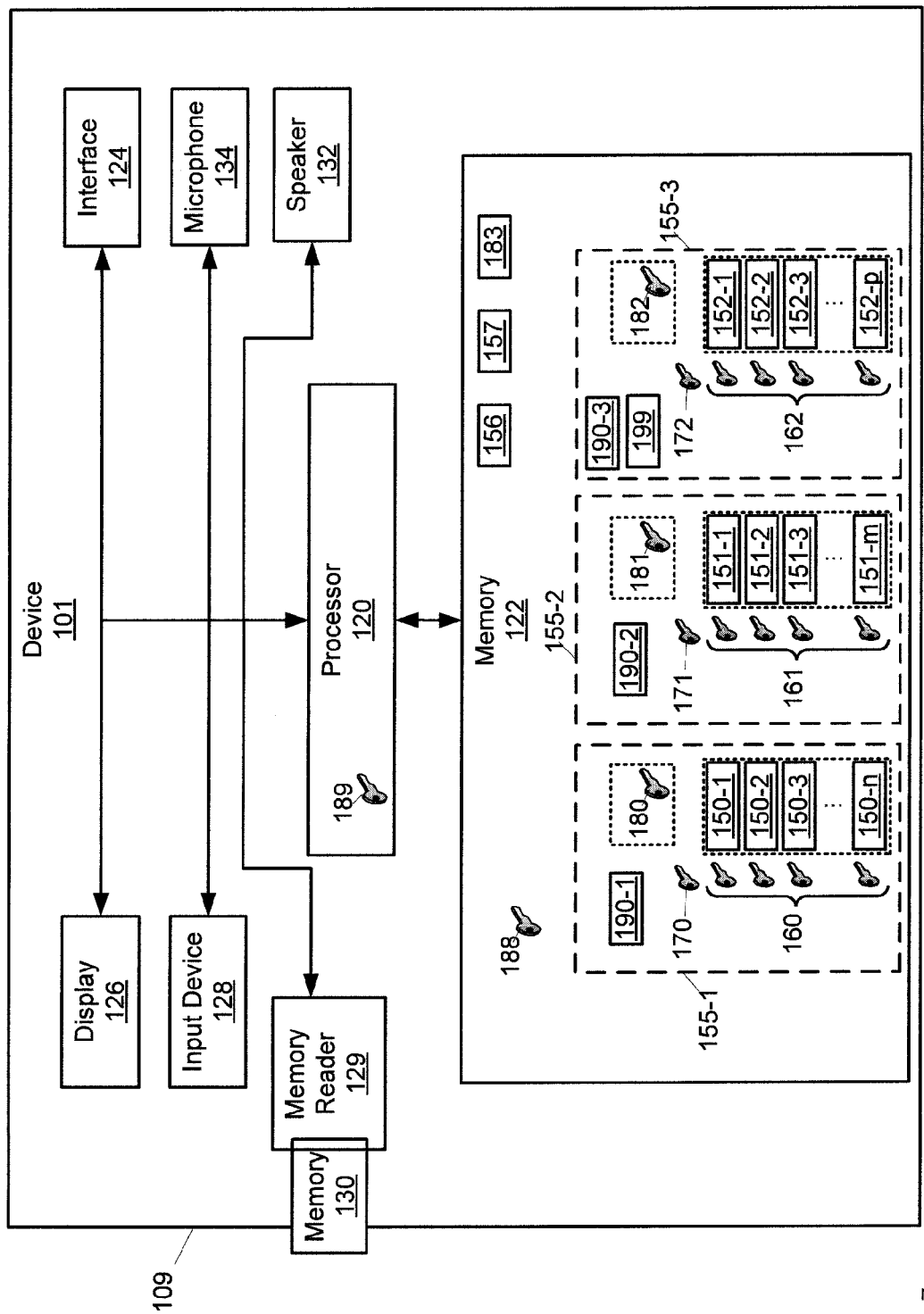
FIG. 7 depicts the device of FIG. 1 after an operational category and locked category have been unlocked, according to non-limiting implementations.

For example, attention is next directed to FIG. 7 which depicts device 101 after domain master keys 181, 182 are used to respectively decrypt domain keys 171, 172: the unencrypted versions of domain keys 181, 182 are destroyed, while the encrypted versions of domain keys 181, 182 persist at memory 122, and/or domain keys 181, 182 can again be generated once input data 600 is again received at input device 128. Further, domain keys 171, 172 have been used to respectively decrypt file encryption keys 161, 162.

In some implementations, file encryption keys 161, 162 are not decrypted when domain keys 171, 172 are decrypted; rather a given file encryption key 161, 162 can be decrypted using the associated domain key 171, 172 when an associated set of data 151, 152 is to be accessed, for example by an application 157.

Figure 8:
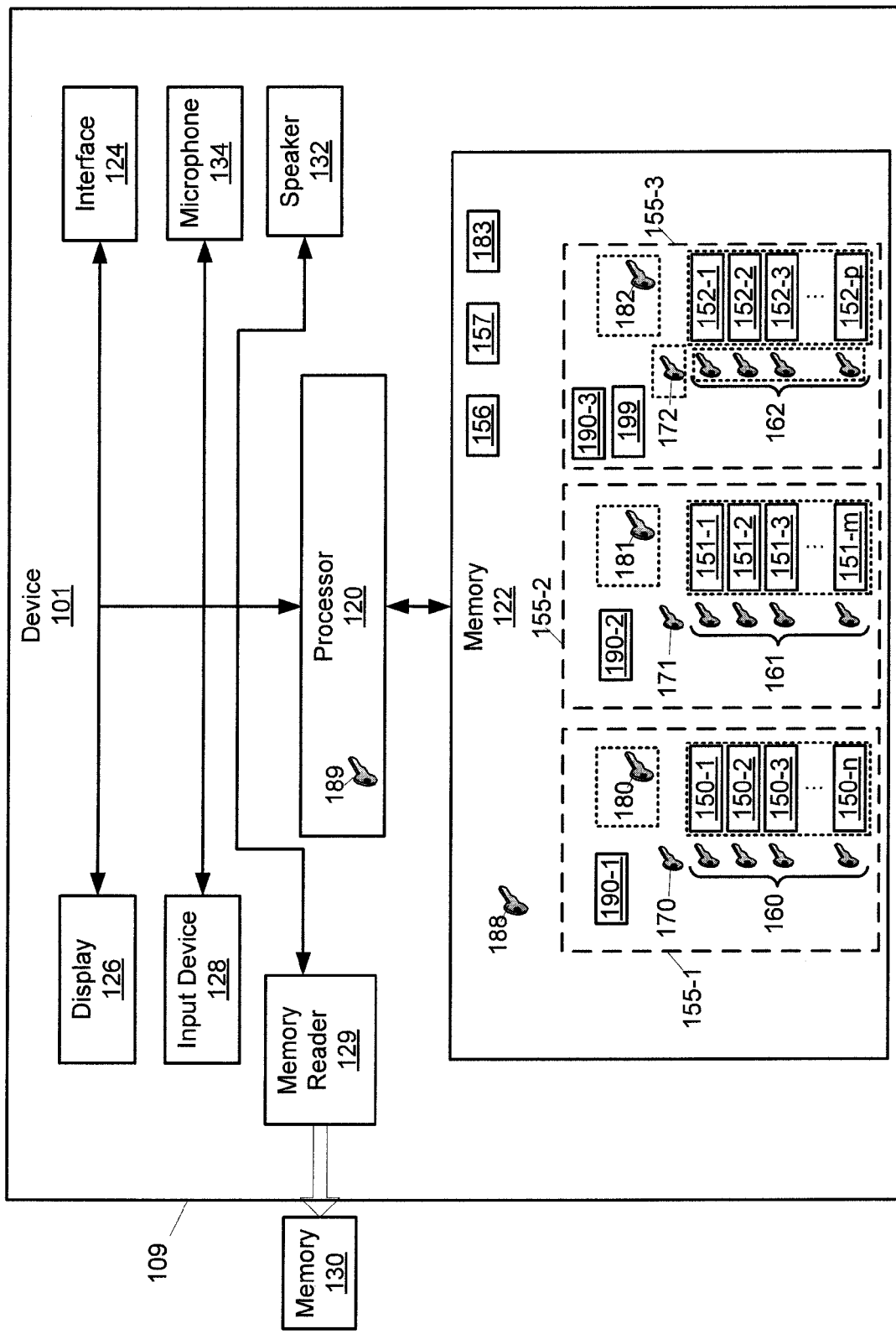
FIG. 8 depicts the device of FIG. 1 after locking trigger criteria are met and locked category is again locked, according to non-limiting implementations.

Attention is next directed to FIG. 8, which depicts device 101 after a locking trigger criteria 199 is met for category 155-3. For example, a data lock timeout can occur, external memory 130 can be removed from external memory reader 129, a lock request can be received from an application 157, a remote server and/or a third party application (e.g. located at the remote server). Once the locking trigger criteria 199 is met associated category 155-3 is locked, and hence unencrypted versions of keys 162, 172 are destroyed, though encrypted keys 162, 172 persist at memory 122. Hence, comparing FIG. 8 to FIG. 1, it is clear that in FIG. 8, category 155-3 is in the same state as in FIG. 1, hence in FIG. 8, category 155-3 is in the same state as when device 101 is off.

Figure 9:
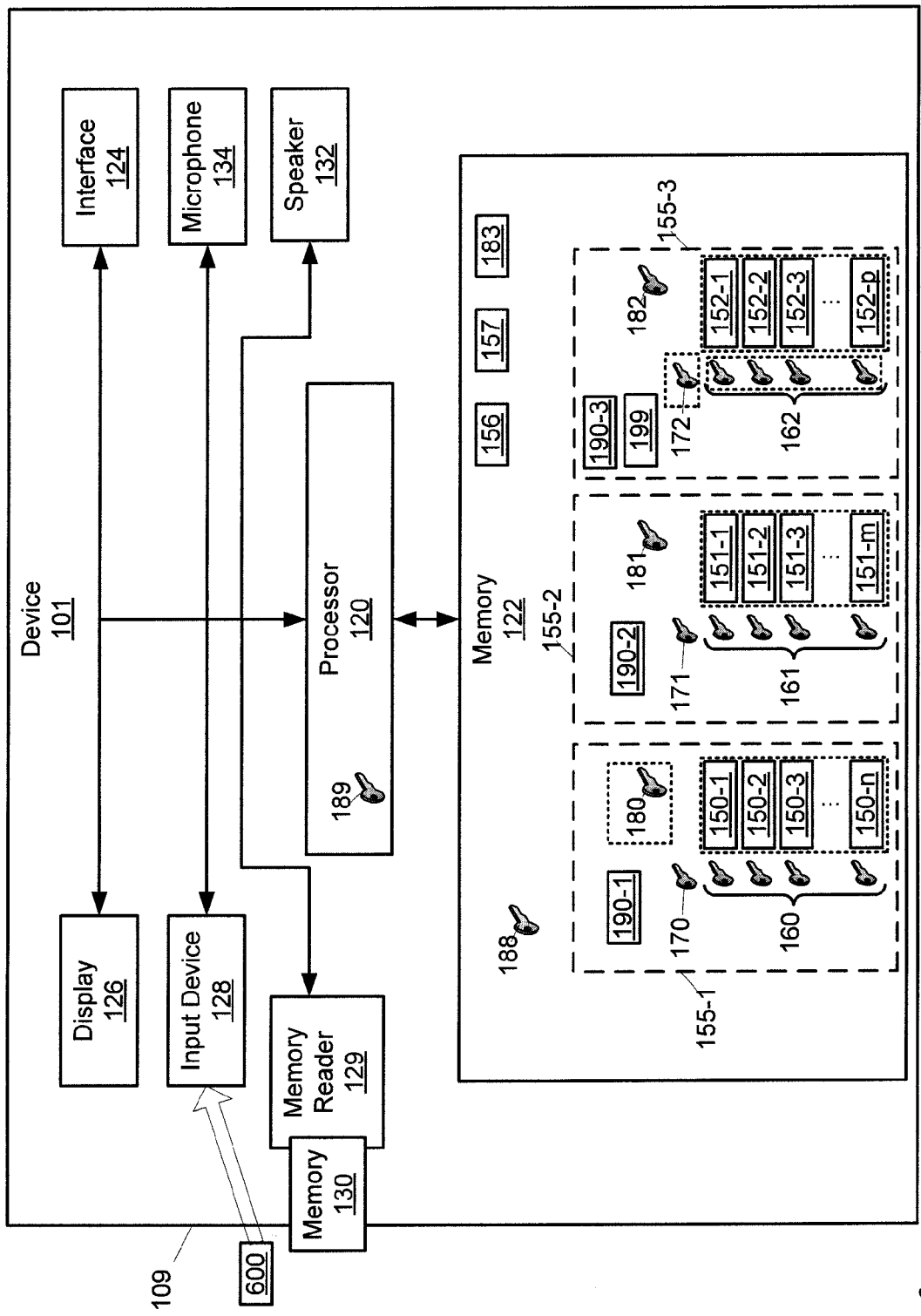
FIG. 9 depicts the device of FIG. 1 after authentication reoccurs and the locked category is again unlocked, according to non-limiting implementations.

Attention is next directed to FIG. 9, which depicts device 101 again receiving input data 600 (and again, in some implementations, external memory 130 has again been received in external memory reader 129). For example, a graphic user interface (GUI) can be provided at display 126 indicating that category 155-3 is locked (e.g. the associated domain is locked) and input data 600 can be requested in the GUI. Once input data 600 is again received, domain master key 182 is again decrypted and/or generated, as further depicted in FIG. 9, which can then again be used to decrypt domain key 172, which can in turn be used to decrypt keys 162 and/or when access to associated data 152 is requested.

It is further appreciated that while category 155-3 is locked, data associated with category 155-3 can be received at device 101: for example, a message can be received that is categorized as being sensitive. However, as domain key 172 is not accessible while category 155-3 is locked, the message cannot yet be encrypted using an associated file key 152, which has to be generated and in turn encrypted using domain key 172. In these implementations, device 101 can further store a public asymmetric encryption key, which can be used to temporarily encrypt the message until category 155-3 is unlocked; device 101 further stores an associated private asymmetric encryption key which can be used to decrypt the message once category 155-3 is unlocked. The private asymmetric encryption key can itself be encrypted using one or more of domain key 172 and a file key 152; the private asymmetric encryption key then becomes available to decrypt the message once category 155-3 is again unlocked. A file encryption key 162 can then be generated and the message can be encrypted therewith.

In some implementations, one or more categories 155 and/or device 101 can be in different locked states, depending on one or more of locking trigger criteria 199 and further data lock trigger criteria stored at device 101, which can cause various features of device 101 to be locked when respective data lock trigger criteria are met. In particular, device 101 can be in one of the following lock states:

LOCKED: Categories 155-2, 155-3 are fully locked (i.e. no associated data keys are decrypted), as first authentication has not yet occurred; category 155-1 is locked only while device 101 is off, otherwise access to start-up data 150 is available.

UNLOCKED: In an unlocked category 155, full access to associated data 150, 151, 152, is available.

UX_LOCKED: A category 155 can be in a user interface (UI) lock, in which access to associated data 150, 151, 152 is allowed by applications 157, but an associated graphic user interface prevent users from accessing category-related data 150, 151, 152; such a UX_LOCKED state can occur when an associated category timeout occurs.

PENDING_DATA_LOCK: A category 155 is in transition to the LOCKED state; applications 157 are to prepare for data lock to be enforced, as described above.

DATA_LOCKED: Category 155-3 is in a full lock state (after initial user authentication); only access to start-up data 150 and operational data 151 is possible.

Persons skilled in the art will appreciate that there are yet more alternative implementations and modifications possible. For example, techniques described herein can be applied to any number of categories 155 and any number of locking trigger criteria 199. Furthermore, present implementations include dynamically creating categories 155 and/or criteria 190 and/or locking trigger criteria 199 and/or dynamically changing categories 155 and/or criteria 190 and/or locking trigger criteria 199. For example criteria 190 and/or locking trigger criteria 199 can be dynamically created and/or changed for an existing category 155 based on commands received from a server (not depicted) associated with an entity operating and/or issuing device 101. Similarly, one or more categories 155 can be created based on commands from the server: for example an administrative category could be created, accessible only upon receipt of an administrative password and/or PIN.

Described herein is a method, and apparatus for controlling access to encrypted data, and specifically controlling access to different categories of encrypted data based on criteria associated with each category; at least one category can be controlled using knowledge that is not stored at the apparatus, for example a password and/or a PIN and/or data stored at an external memory insertable at an external memory reader at the apparatus. However, data that should be available for starting the device can be made available upon start-up, while data that should be available for operating the device can be made available upon a first authentication at the device. Sensitive data that is generally locked (i.e. encrypted) is fully inaccessible when the apparatus is in a data lock state; indeed, in the data lock state, the sensitive data is stored in the same manner as when the apparatus is off and/or powered down.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A method comprising:
controlling access to encrypted data files, stored at a memory of a device, the encrypted data files categorized according to a plurality of categories, each encrypted data file encrypted using one or more respective file encryption keys, each respective file encryption key in a category encrypted using a respective category key respective to the category, the respective category key encrypted using a respective domain master key respective to the category, the respective domain master key available using a system master key, which is turn encrypted using a processor key stored at a processor of the device, the system master key configured to protect each of respective domain master keys of each of the plurality of categories; and,
controlling access to the encrypted data files by: upon startup of the device, decrypting the system master key using the processor key; and, when criteria associated with the category is met:
one or more of decrypting or generating the respective domain master key;
decrypting the respective category key using the respective domain master key;
decrypting the one or more respective file encryption keys using the respective domain master key;
destroying an unencrypted respective domain master key after the one or more respective file encryption keys are decrypted,
the criteria comprising one or more of: the device being turned on; receiving a password at an input device of the device that matches password data stored at the memory; or receiving a personal identification number at the input device that matches data read from an external memory reader of the device.

2. The method of claim 1, wherein each of the plurality of categories is based on one or more of a ranking system, data sensitivity, operational needs of the device, or usability of the device.

3. The method of claim 1, wherein the encrypted data files are stored in partitions of the memory based on the plurality of categories, each of the partitions comprising one or more of a physical partition of the memory or a virtual partition.

4. The method of claim 1, wherein:
the category comprises a start-up category, start-up encrypted data files associated therewith used to start the device when the device is turned on and prior to receiving user input at the input device,
start-up criteria associated with the start-up category comprising determining that the device has been turned on, the respective master domain key comprising a master start-up domain encryption key, the respective category key comprising a start-up domain encryption key,
the start-up encrypted data files remaining accessible once the master start-up encryption key is accessed after the start-up criteria is met, and after the start-up encrypted data files are decrypted using the start-up domain encryption key.

5. The method of claim 1, wherein:
the category comprises an operational category, operational encrypted data files associated therewith used to one or more of: operate the device after the device is turned on; perform operations at the device; or provide a user with an operational experience at the device,
operational criteria associated with the operational category comprising:
receiving input using an input device, that matches one or more of the password data stored at the memory or the personal identification number read from an external memory received in the external memory reader of the device, the respective master domain key comprising a master operational domain encryption key, the respective category key comprising an operational domain encryption key, the operational encrypted data files remaining accessible once master operational encryption key is accessed after the operational criteria is met, and after the operational encrypted data files are decrypted using the operational domain encryption key.

6. The method of claim 1, wherein:
the category comprises a locked category of locked encrypted data,
locked criteria associated with the locked category comprising: receiving input using the input device, that matches one or more of the password data stored at the memory or the personal identification number read from an external memory received in the external memory reader of the device, the respective master domain key comprising a master locked domain encryption key, the respective category key comprising a locked domain encryption key,
the method further comprising: once the master locked encryption key is accessed after the criteria is met:
 decrypting, using the master locked domain encryption key, at least one of the respective file encryption keys for decrypting the locked encrypted data; and,
 destroying at least one decrypted respective file en encryption key when one or more locking trigger criteria are met such that the locked encrypted data is no longer accessible until the locked criteria is again met.

7. The method of claim 6, wherein the locking trigger criteria comprise one or more of:
determining that a time-out period has occurred;
receiving, at the device, a locking command from a server;
receiving a locking command from applications running at the device;
determining that an external memory has been removed from the external memory reader; or,
determining that device is being one or more of turned off or powered down.

8. The method of claim 6, further comprising one or more of:
controlling applications running at the device to transition to a reduced functionality state once the one or more locking trigger criteria are met; or,
stopping the applications running at the device once the one or more locking trigger criteria are met.

9. A device comprising:
a processor and a memory, the processor configured to:
 control access to encrypted data, stored at the memory, the encrypted data files categorized according to a plurality of categories, each encrypted data file encrypted using one or more respective file encryption keys, each respective file encryption key in a category encrypted using a respective category key respective to the category, the respective category key encrypted usina a respective domain master key respective to the category, the respective domain master key available using a system master key, which is turn encrypted using a processor key stored at the processor, the system master key configured to protect each of respective domain master keys of each of the plurality of categories; and,
 control access to the encrypted data files by: upon startup of the device, decrypting the system master key using the processor key; and, when criteria associated with the category is met:
  one or more of decrypting or generating the respective domain master key;
  decrypting the respective category key using the respective domain master key;
  decrypting the one or more respective file encryption keys using the respective domain master key;
  destroying an unencrypted respective domain master key after the one or more respective file encryption keys are decrypted,
 the criteria comprising one or more of: the device being turned on; receiving a password at an input device of the device that matches password data stored at the memory; or receiving a personal identification number at the input device that matches data read from an external memory reader of the device.

10. The device of claim 9, further comprising an input device, wherein:
the category comprises a start-up category, start-up encrypted data files associated therewith used to start the device when the device is turned on and prior to receiving user input at the input device,
start-up criteria associated with the start-up category comprising determining that the device has been turned on, the respective master domain key comprising a master start-up domain encryption key, the respective category key comprising a start-up domain encryption key,
the start-up encrypted data files remaining accessible once the master start-up encryption key is accessed after the start-up criteria is met, and after the start-up encrypted data files are decrypted using the start-up domain encryption key.

11. The device of claim 9, wherein:
the category comprises an operational category, operational encrypted data files associated therewith used to one or more of: operate the device after the device is turned on; perform operations at the device; or provide a user with an operational experience at the device,
operational criteria associated with the operational category comprising: receiving input using an input device, that matches one or more of the password data stored at the memory or the personal identification number read from an external memory received in the external memory reader of the device, the respective master domain key comprising a master operational domain encryption key, the respective category key comprising an operational domain encryption key,
the operational encrypted data files remaining accessible once master operational encryption key is accessed after the operational criteria is met, and after the operational encrypted data files are decrypted using the operational domain encryption key.

12. The device of claim 9, wherein:
the category comprises a locked category of locked encrypted data,
locked criteria associated with the locked category comprising: receiving input using the input device, that matches one or more of the password data stored at the memory or the personal identification number read from an external memory received in the external memory reader of the device, the respective master domain key comprising a master locked domain encryption key, the respective category key comprising a locked domain encryption key,
the method further comprising: once the master locked encryption key is accessed after the criteria is met,
decrypting, using the master locked domain encryption key, at least one of the respective file encryption keys for decrypting the locked encrypted data; and, destroying at least one decrypted respective file en encryption key when one or more locking trigger criteria are met such that the locked encrypted data is no longer accessible until the locked criteria is again met.

13. A non-transitory computer medium storing a computer program code wherein execution of the computer program is for:

controlling access to encrypted data files, stored at a memory of a device, the encrypted data files categorized according to a plurality of categories, each encrypted data file encrypted using one or more respective file encryption keys, each respective file encryption key in a category encrypted using a respective category key respective to the category, the respective category key encrypted using a respective domain master key respective to the category, the respective domain master key available using a system master key, which is turn encrypted using a processor key stored at a processor of the device, the system master key configured to protect each of respective domain master keys of each of the plurality of categories; and, controlling access to the encrypted data files by: upon startup of the device, decrypting the system master key using the processor key; and, when criteria associated with the category is met:

one or more of decrypting or generating the respective domain master key;

decrypting the respective category key using the respective domain master key;

decrypting the one or more respective file encryption keys using the respective domain master key;

destroying an unencrypted respective domain master key after the one or more respective file encryption keys are decrypted, the criteria comprising one or more of: the device being turned on; receiving a password at an input device of the device that matches password data stored at the memory; or receiving a personal identification number at the input device that matches data read from an external memory reader of the device.

\* \* \* \* \*